United States Patent [19]

Mascioli

[11] Patent Number: 4,968,724

[45] Date of Patent: Nov. 6, 1990

[54] HYDRATED SALT SYSTEMS FOR CONTROLLED RELEASE OF WATER IN POLYURETHANE FOAMS

[75] Inventor: Rocco L. Mascioli, Media, Pa.

[73] Assignee: Arco Chemical Technology, Inc., Wilmington, Del.

[21] Appl. No.: 531,223

[22] Filed: May 31, 1990

[51] Int. Cl.$^5$ ................................................ C08J 9/12
[52] U.S. Cl. .................................... 521/103; 521/106; 521/120; 521/123
[58] Field of Search ................. 521/103, 106, 123, 120

[56] References Cited

U.S. PATENT DOCUMENTS 3,169,826  2/1965  Pond et al. ............................... 23/67
4,882,363  11/1989  Neuhaus et al. ...................... 521/122

FOREIGN PATENT DOCUMENTS 947833    3/1956   Fed. Rep. of Germany .
1173240   7/1964   Fed. Rep. of Germany .
28427     9/1976   Japan .
1214478   12/1970  United Kingdom .

*Primary Examiner*—Morton Foelak
*Attorney, Agent, or Firm*—David L. Mossman

[57] ABSTRACT

Novel polyurethane resin foam compositions are provided which are only water-blown and require no halocarbon blowing agents, yet suffer no degradation in physical properties. The formulations include a hydrated salt containing at least two hydrated salts that release water at a temperature above 80° C. By using at least an acidic salt and a basic salt, the pH of the salt system may be balanced. A preferred hydrated salt system is a combination of borax (sodium tetraborate decahydrate) and alum (aluminum potassium sulfate dodecahydrate).

28 Claims, No Drawings

HYDRATED SALT SYSTEMS FOR CONTROLLED RELEASE OF WATER IN POLYURETHANE FOAMS

FIELD OF THE INVENTION

The invention relates to the synthesis of polyurethane compositions and methods for making the same, and in one aspect, is more particularly related to polyurethane compositions that are blown with carbon dioxide generated using water released from hydrated salts.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Polyurethane foams are also used in sponges and for other uses that require liquid absorption properties, such as personal care and hygiene items, and also for specialty packaging.

The art and science of producing polyurethane foams involves controlling polymerization while liberating a blowing agent to produce a cellular mass. The gas that blows the foam also fills the polyurethane foam cells. Commonly used blowing agents are carbon dioxide, fluorocarbons and methylene chloride. The resultant density of a polyurethane foam is controlled by the quantity and efficiency of the blowing agents. While carbon dioxide may be generated as a blowing agent through the reaction of water with the isocyanate, the use of low-boiling inert liquids, in particular fluorocarbons, to augment or replace the chemical blowing action has lead to certain property advantages in the final foams, such as low thermal conductivity characteristic of the trapped fluorocarbon gas.

However, the chlorofluorocarbons (CFCs) used as blowing agents, and for other purposes, are now suspected to be linked to the depletion of ozone in the upper atmosphere where the generally inert CFCs are ultimately decomposed by ultraviolet light. To avoid this problem, polyurethane resins blown only with carbon dioxide from the reaction with water have acquired renewed interest.

Rates of reactions of the foaming ingredients are controlled by the nature of the catalysts employed. It is recognized that tertiary amines are added to control the reaction of water and isocyanate to liberate carbon dioxide. Polymerization of polyol and isocyanate is catalyzed by metal salts, in particular, tin salts as an example. In order to produce a good foam, the rates of polymerization and blowing must be carefully balanced by adjusting the amounts of tertiary amines and tin catalysts.

In addition, the major parameters regulating flexible polyurethane foam hardness are both the relative amount of each segment in the hard segment/soft segment ratio and their distribution in the polymer chain. A balance of hard and soft segments is necessary to produce the optimum physical properties.

A typical formulation for a flexible foam would consist of 100 parts of a polyol for the soft segment and 3 parts of water for the hard segment and $CO_2$ generation. From the stoichiometry, it is apparent that at water levels of 3 parts and above that the hard segment becomes a significant percentage that overpowers the softening characteristics of the polyols. Because of the high ratios of water in the formulation, the water-isocyanate reaction takes place very rapidly.

Many attempts have been made to control the water-polyolisocyanate reactions in order to improve the quality of the finished product. For example, to slow down the rate of the water-isocyanate reaction, amine salts are often used as catalysts. A specific example is the formate salt of triethylenediamine. The cream time (water reaction) is delayed slightly to permit the polymerization reaction (polyol) to proceed.

It has been suggested to use hydrated salts in polyurethane formulations. For example, German Patent No. 947,833 describes apparently rigid porous foamed materials obtained from the reaction products of diisocyanates with high molecular weight polyesters containing at least two groups capable of being substituted by isocyanate radicals. The addition of salts containing water of crystallization or surfactants having adsorbed water to the above mixture generates carbon dioxide which acts as the blowing agent. These salts and surface-active substances are used as propellants instead of water or low-molecular organic hydroxyl compounds. Examples for such propellants are borax containing water of crystallization and humid activated carbon.

U.S. Pat. No. 3,169,826 relates to a method of preparing a hydrated magnesium carbonate, and incidentally mentions the particular salt produced liberates water at a relatively low rate and at a temperature below about 100° C. to thereby control the rate of foaming during the reaction between polyesters and polyisocyanates to produce a polyurethane foam. Finely divided man-made calcium sulfate dihydrate was found to be particularly useful in the production of cellular polyurethanes because it liberates water over a narrow temperature range, according to British Patent No. 1,214,478.

Also of interest is the abstract to Japanese Kokai Patent Document No. 58-67,713 (Chemical Abstracts 99:213682e, 1983) which describes rigid polyurethane foams made from isocyanate-terminated prepolymers and compounds containing water of crystallization. Specifically mentioned is a mixture of $Na_2SO_4.10H_2O$ and $Na_2SO_4$.

Additionally of note is U.S. Pat. No. 4,882,363 which discusses a process for the production of fluorocarbon-free, rigid polyurethane foams from a reaction mixture based on (a) a polyisocyanate component containing at least one aromatic polyisocyanate, (b) a polyhydroxyl component, (c) blowing agents, which may be water and/or carbon dioxide, (d) catalysts and (e) zeolite adsorbents. The zeolitic absorbents may be synthetic faujasite zeolites having the general formula

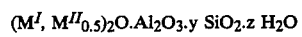

$$(M^I, M^{II}_{0.5})_2O.Al_2O_3.y\ SiO_2.z\ H_2O$$

in which $M^I$ represents sodium or potassium cations; $M^{II}$ represents calcium or magnesium cations; y has a value of 2 to 6, those of the x type having a y-value of 2 to 3 and those of the y type having a y-value of 3 to 6; and z represents 0 or a number of up to 5.5 (x type) or 0 or a number of up to 8 (y type).

Of lesser importance is Japanese Patent Application No. 28427/75 which describes a process for preparing polyurethane foams by adding a foaming agent such as a fluorocarbon, and an amine and/or organotin compound as a catalyst to a polyol and an isocyanate, characterized by adding at least one of hydrous alkali, metal compounds thereto. These hydrous alkali metal compounds include sodium borates, sodium phosphates, sodium carbonates, alum, etc. These materials are used as co-catalysts with no expectation or suggestion that the foaming reaction is affected. Fluorocarbons are still used as a blowing agent.

Additionally, there is German Patent No. 1,173,240 which relates to the use of known zeolite molecular sieves charged with amine catalysts in a process for the preparation of polyurethane foams. An inert, hydrated salt is used together with the tertiary amine forming catalyst and finely divided crystalline molecular sieves having a diameter of not more than 20 Å-units. The inert hydrated salts for the German Patent release water at a temperature of approximately 50° to 150° C., such as crystallized barium chloride ($BaCl_2.2H_2O$), crystallized manganous chloride ($MnCl_2.4H_2O$), crystallized calcium sulfite ($CaSO_3.2H_2O$) or crystallized calcium lactate (($CaC_3H_5O_3)_2.5H_2O$). It is noted that sodium salts or potassium salts are less suited in this process.

However, some of the formulations of these documents do not avoid the use of fluorocarbons and many do not broadly address polyurethanes in that they are limited to rigid foams. Additionally, the hydrated salts are either acidic or basic. The problem with the acidic salts if used in proportions to be effective water sources is that they tend to tie up the amine groups of the catalyst prematurely. The problem with the basic salts is that too many side reactions tend to occur and more trimerization happens than is desirable. Additionally there is the problem of deterioration in resultant polyurethane foam properties when any additive is employed and the same is true with the hydrated salts. It would be useful to discover an improved polyurethane composition employing only water as a blowing agent which would not have its properties degraded at all, and particularly not in the manner of the prior approaches, but which would have water generated in a controlled manner.

SUMMARY OF THE INVENTION

Accordingly, it is an object of the present invention to provide a hydrated salt system for polyurethane compositions, which system would help provide water in a controlled manner to generate carbon dioxide as a blowing agent thereby avoiding the use of fluorocarbons.

It is yet another object of the invention to provide a novel hydrate salt system for use in polyurethane compositions that does not adversely affect the properties of the resultant polyurethane compositions.

It is another object of the present invention to provide a hydrated salt system that can be readily employed with available polyurethane technology.

In carrying out these and other objects of the invention, there is provided, in one form, a polyurethane foam composition comprising the reaction product of a polyol with a polyisocyanate in the presence of a polyurethane catalyst, and further in the presence of a hydrated salt system comprising at least two hydrated salts which release water at a temperature above 80° C.

DETAILED DESCRIPTION OF THE INVENTION

It has been discovered that special blends of hydrated salts can be used to advantage and avoid the adverse effects of prior formulations that employed only one salt at a time. The water reaction can be controlled by discharge of water which is chemically bound in these hydrated salt systems. The water is relatively slowly released as the heat of reaction is generated. The slow release of water builds up the soft segment of the foam from the polymerization reaction. With the controlled release of water, there can be a carefully controlled balance of the polymerization and blowing reactions. Ultimately, maximum physical properties could be obtained in the urethane polymer, and it was surprising to find that use of these hydrated salt system additives did not denigrate the polyurethane foam properties. Typically, the loss in properties is expected to be proportional to the amount of the additive, but this general principle was not found to apply in this case.

The hydrated salt systems of the present invention require at least two hydrated salts which release water at a temperature above about 80° C. The fact that these hydrated salt systems avoid the problems of using a single hydrate salt as do the prior formulations may have to do with the fact that using both acidic and basic salts in the systems helps to adjust the pH of the system and simultaneously gives greater control over the water generation. That is, pH and water quantity generation may be both adjusted with the same materials by using certain salt pairs. For example, borax (sodium tetraborate decahydrate) is too basic used along and alum (aluminum potassium sulfate dodecahydrate) is too acidic used alone, giving the poorer results described previously. However, by mixing the salts as a water source, the pH could be adjusted to be about 9, which gave good results. In one aspect of the invention, the pH of the entire system should range between about 6 to about 9, preferably from about 7 to about 8.

In one aspect of the invention, the hydrated salts may be selected from the group including, but not necessarily limited to:

| | |
|---|---|
| aluminum potassium sulfate dodecahydrate (alum) | $KAl(SO_4)_2.12H_2O$; |
| sodium phosphate dodecahydrate | $Na_3PO_4.12H_2O$; |
| aluminum sulfate octadecahydrate | $Al_2(SO_4)_3.18H_2O$; |
| sodium sulfate decahydrate | $Na_2SO_4.10H_2O$; |
| sodium carbonate heptahydrate | $Na_2CO_3.7H_2O$; |
| aluminum ammonium sulfate dodecahydrate (alum) | $AlNH_4(SO_4)_2.12H_2O$; |
| magnesium phosphate docosahydrate | $Mg_3(PO_4)_2.22H_2O$; |
| sodium borate decahydrate (borax) | $Na_2B_4O_7.10H_2O$ | mixtures thereof. It is anticipated that more than two hydrated salts may also be useful in certain cases. It is apparent that from the salts listed that salts with different water capacities and pH may be selected as needed for system and foam formulation requirements.

Particular hydrated salt systems that are known or anticipated to be useful in polyurethane formulations include, but are not necessarily limited to:
(a) $K Al(SO_4)_2.12H_2O$ and $Na_2B_4O_7.10H_2O$;
(b) $K Al(SO_4)_2.12H_2O$ and $Na_3PO_4.12H_2O$;
(c) $Al_2(SO_4)_3.18H_2O$ and $Na_2B_4O_7.10H_2O$;
(d) $Al_2(SO_4)_3.18H_2O$ and $Na_3PO_4.12H_2O$;
(e) $Al_2(SO_4)_3.18H_2O$ and $Na_2CO_3.7H_2O$;
(f) $K Al(SO_4)_2.12H_2O$ and $Mg_3(PO_4)_2.22H_2O$;
(g) $Na_2SO_4.10H_2O$ and $Na_3PO_4.12H_2O$; and
(h) $AlNH_4(SO_4)_2.12H_2O$ and $Na_2B_4O_7.10H_2O$.
Mixtures of these systems may be used as well. Borax and the various forms of alum are particularly preferred hydrated salt systems because of their ready availability.

The amount of the hydrate salt system used in a polyurethane formulation will depend on a number of factors, including, but not limited to: (1) the amount of water to be liberated during the reaction; (2) the amount of water to be added to the formulation that is not bound up in the hydrated salt system, if any; and (3) the particular hydrated salt system used. The total water content normally used based on 100 parts by weight (pbw) of the polyol present, ranges from about 0.5 to 8 pbw, and in one aspect ranges from about 1.0 to about 7 pbw. Thus, within these parameters, the hydrated salt system proportion itself could range from as low as 5 pbw to as high as 25 pbw, based on 100 pbw of the polyol. Very generally, about 25% of the weight of the hydrated salt systems may come off as water during the exotherm to be reacted with isocyanate to produce $CO_2$.

While a formulation might be conceived where all of the water is generated by the hydrated salts, it is expected that in most cases additional water that is not bound up in the salts would be desirable. Further, while additional blowing agents, even including fluorocarbons, could also be used, polyurethane foams with good properties may be produced without the necessity for any additional halocarbon blowing agents.

Procedurally, the hydrated salt system may be added at many points in the process, but preferably not in the isocyanate component. In one aspect, it is preferred that the hydrated salts be added in the polyol component. The salts should physically be added as very fine particles. This physical form will help them stay in suspension in the polyol.

In accordance with this invention, the remaining polyurethane foam components are expected to be conventional, indicating that the invention is compatible with standard formulations. For example, a variety of relatively high molecular weight polyether and/or polyester polyols are expected to be useful for the polyurethane compositions of this invention. These polyols include, but are not necessarily limited to ethylene oxide (EO) capped polyols and polyols not capped with EO, as well as propylene oxide (PO) and/or butylene oxide containing polyols. The polyols may contain blocks or random distributions of these various alkylene oxides added to suitable initiators. In one aspect, the polyol preferably has a molecular weight of from about 300 to 10,000, and is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP), α-methylglucoside, β-methylglucoside, or other methylglucoside, resins of phenol, aniline and mixed phenol aniline, such as methylenedianiline or bisphenol A, Mannich condensates and mixtures thereof, for example. The polyol may be made by alkoxylating the initiator with a desired number of moles of an alkylene oxide. Preferably, the alkylene oxide has two to four carbon atoms, and is thus, EO, PO, butylene oxide or mixtures thereof, as noted. The oxides may be mixed upon addition, or may be added to the polyol initiator chain separately to form blocks or caps. In one aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein. Alternatively, various polymer polyols may also be employed as completely replacing or in conjunction with the suitable, enumerated polyol components. Preferably, the relatively high molecular weight polyalkylene triol is a mixed polypropylene oxide/polyethylene oxide copolymer triol.

A catalyst is typically employed in preparing polyurethane foams in the conventional manner. Such catalysts may include one or more of the following:

(a) Tertiary amines such as trimethylamine; triethylamine; N-methylmorpholine; N-ethylmorpholine; N,N-dimethylbenzylamine; N,N-dimethylethanolamine; N,N,N',N'-tetramethyl-1,3-butanediamine; N,N-dimethylpiperazine; 1,4-diazabicyclo[2.2.2]octane; triethylenediamine and the like;

(b) Tertiary phosphines such as trialkylphosphines; dialkylbenzylphosphines, and the like;

(c) Strong bases, such as alkali and alkaline earth metal hydroxides; alkoxides; and phenoxides;

(d) Acidic metal salts of strong acids, such as ferric chloride; stannic chloride; stannous chloride; antimony trichloride; bismuth nitrate and chloride; and the like;

(e) Chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bis-acetylacetonealkylenediamine; salicyclaldehydeimine; and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals, such as $Ti(OR)_4$; $Sn(OR)_4$; $Al(OR)_3$; and the like, wherein R is alkyl or aryl, and the reaction products of alcoholates with carboxylic acids, β-diketones, and 2-(N,N-dialkylamino)alcohols;

(g) Salts or organic acids with a variety of metals, such as alkali metals, alkaline earth metals, Al, Sn, Pb, Mn, Co, Ni and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 pbw percent, based on 100 pbw of the polyol. More often, the amount of the catalyst used is about 0.2 to about 2.0 pbw.

The polyol for the polyurethane composition is reacted in the presence of one or more of the above catalysts with a polyisocyanate according to conventional procedures. The polyisocyanate used may be any aromatic or aliphatic polyisocyanate, such as toluene diisocyanates (TDIs); polymeric isocyanates and aliphatic diisocyanates. Typical aromatic polyisocyanates include, but are not limited to, m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; diphenylene-4,4'-diisocyanate; aliphatic-aromatic diisocyanates, such as xylylene-1,4-diisocyanate; xylylene-1,2-diisocyanate; xylylene-1,3-diisocyanate; bis(4-isocyanatophenyl)methane; bis(3-methyl-4-isocyanatophenyl)methane; and 4,4'-diphenylpropane diisocyanate. Suitable aliphatic diisocyanates would include isophorone diisocyanate; hexamethylene diisocyanate; and methylene-biscyclohexylisocyanate. Toluene diisocyanates are preferred, in one aspect of the invention.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts.

Additives to regulate the cell size and the cell structure, for example, silicone surfactants such as dimethylpolysiloxanes, may also be added to the foaming mixture. Fillers, dyes or plasticizers of known types may also be used, of course. These and other additives are well known to those skilled in the art.

The invention will be further described with reference to the following Examples which are merely illustrative and not definitive.

EXAMPLES 1-6

Examples Using a Single Hydrated Salt

The following Examples were conducted using the formulations given immediately below. The proportions of single hydrated salts and water, as well as foam characteristics are given in Table I.

| | |
|---|---|
| Thanol ® 3020 polyol, pbw | 100 |
| Water, pbw | 5.5 |
| Silicone L-6202 surfactant, pbw | 1.5 |
| 33LV/Al (2/1) Tertiary catalysts, pbw | 0.5 |
| T-9 Stannous alkyl hexoate tin catalyst, pbw | 0.3 |
| Isocyanate index: | 1.1 |

TABLE I

Foams Made Using Single Hydrated Salts

| Salt type | $Na_2B_4O_7 \cdot 10H_2O$ | | | | $Na_2SO_4 \cdot 10H_2O$ | |
|---|---|---|---|---|---|---|
| Example No. | 1 | 2 | 3 | 4 | 5 | 6 |
| Salt amount, pbw | None | 20 | 20 | 20 | 20 | 20 |
| Add'l. water, pbw | 5.5 | 0 | 0.5 | 1.0 | 0.5 | 1.0 |
| Cream time, sec. | 7 | 20 | 7 | 5 | 7 | 5 |
| Rise time, sec. | 55 | 100 | 80 | 100 | 80 | 76 |
| Denity, pcf | 1.7 | 2.6 | 2.1 | 1.7 | 2.1 | 2.1 |

Based on density and activity, adding 20 parts $Na_2B_4O_7 \cdot 10H_2O$ (borax) released about 4 parts water. These foams were made with small quantities and did not generate high exotherms. An example of increased exotherm was shown by scaling up the foams containing $Na_2SO_4 \cdot 10H_2O$ by a factor of 2.5 times. Density was reduced from 2.1 to 1.4 indicating the amount of water given off is dependent on the heat generated in the foam.

EXAMPLES 7-10

Examples Using Hydrated Salt Systems

Examples 7 through 9 employ a multiple hydrated salt system, namely a mixture of borax (sodium tetraborate decahydrate) and alum (aluminum potassium sulfate dodecahydrate) in a weight proportion of 2:1. The hydrated salt system had a pH of about 9. Example 10 is given for comparison and was drawn from an SPI study; 31st Annual SPI Technical/Marketing Conference, 1988, pp. 81-124.

Both salts release water at greater than 80° C. and less than 90° C., which is desirable to minimize the exotherm of the reaction.

Flexible foams were produced using a 3000 molecular weight polyol and typical ingredients to make a foam with densities around 1.4 lbs/ft$^3$. Water was the only variable in making these foams, and it ranged from about 2.1 to about 2.5 parts. The foams were produced on a Maxfoam machine.

Based on the resulting density foams and physical properties, it would be expected that total water in the system was 4.5 parts. This would correspond to a 25% weight loss from the mixed salts. Physical property data of Examples 7, 8 and 9 can be compared to the results of the SPI study in Example 10. As can be seen, there was no loss in physical properties when adding the salt system.

Another benefit we have seen when using hydrated salts is the controlled exotherm. We have shown a reduced bun temperature of 25° C. when compared to using water alone.

TABLE II

Polyurethane Foams Using Borax/Alum Hydrated Salt System

| Examples | 7 | 8 | 9 | 10 |
|---|---|---|---|---|
| Polyol 3020 | 100 | 100 | 100 | |
| TDI (Index) | 60(105) | 60(105) | 60(105) | SPI |
| Amine Catalyst | | | | Study |
| 2 parts Al/1 part 33LV | 0.1 | 0.1 | 1.0 | (Proportions |
| Tin Catalyst T-10 | 0.2 | 0.2 | 0.2 | comparable |
| Silicone L-6202 | 1.5 | 1.5 | 1.5 | to Examples |
| Water | 2.3 | 2.5 | 2.1 | 7-9.) |
| Borax/Alum Salts | 8.0 | 8.0 | 8.0 | None |
| Foam Properties | | | | |
| Density, pcf | 1.4 | 1.3 | 1.4 | 1.29-1.44 |
| IFD | | | | |
| 25% | 27.3 | 27.8 | 29.2 | 33.7-36.7 |
| 65% | 55.1 | 55.9 | 59.0 | 59.8-63.7 |
| 25% Return | 18.8 | 18.9 | 20.0 | 23.7-24.0 |
| Air flow, cfm | 4.9 | 4.5 | 5.0 | 4.0-5.3 |
| Tear strength, pli | 3.2 | 2.7 | 2.7 | 1.9-2.9 |
| Tensile strength, psi | 14.8 | 15.2 | 15.1 | 14.7-17.7 |
| Elongation,% | 268 | 270 | 258 | 154-206 |
| Compression Set, % | | | | |
| 50% | 9.2 | 9.2 | 7.9 | — |
| 90% | 9.7 | 12.5 | 8.7 | 4.0-7.5 |
| Ball Rebound | 45.0 | 46.0 | 45.0 | — |

Many modifications may be made in the hydrated salt systems and the polyurethane foam formulations of this invention and their method of production without departing from the spirit and scope of the invention, which are defined only in the appended claims. For example, one skilled in the art could adjust the temperature, pressure, reactants, proportions and modes of additions within the parameters set forth to provide polyurethane foams with particularly advantageous properties. Other hydrated salts and combinations besides those specifically set forth may also be used within the claimed spirit and scope of the invention.

It is expected that by incorporating water into the urethane formulation by the technique of this invention that larger amounts of water can be added to the polymer. Thus, objectionable blowing agents may be eliminated, but foams with good properties and low densities may still be obtained. The controlled release of water should reduce the danger of run-away exotherms during polymerization. Incorporation of these various salts into the polymer should also reduce flammability.

GLOSSARY

Al catalyst
Niax® Al polyurethane catalyst, 70% bis-(dimethylaminoethyl)ether in propylene glycol, made by Union Carbide Chemical Co.

33LV catalyst
Dabco 33LV tertiary amine catalyst made by Air Products and Chemicals, Inc.

3020 polyol
Thanol® F-3020 polyol - A 3000 molecular weight flexible slab stock polyether polyol of propylene oxide having a hydroxyl number between 54–57, made by ARCO Chemical Co.

T-10 catalyst
A 40–50% solution of stannous alkyl hexoate in di-(2-ethylhexyl)phthalate.

Silicone L-6202
Silicone surfactant made by Union Carbide.

We claim:

1. A polyurethane foam composition comprising the reaction product of a polyol with a polyisocyanate in the presence of a polyurethane catalyst, and further in the presence of a hydrated salt system comprising at least two different hydrated salts which release water at a temperature above 80° C.

2. The polyurethane foam composition of claim 1 where the proportion of the hydrated salt system in the total of the components that make up the reaction product is sufficient to release from about 0.5 to 8 parts by weight of water during the reaction.

3. The polyurethane foam composition of claim 1 where one of the two salts of the hydrated salt system is acidic and the other of the two salts is basic.

4. The polyurethane foam composition of claim 3 where the pH of the salt system is adjusted to be within the range of about 6 to about 9, only by adjusting the proportion of the acidic hydrated salt and the basic hydrated salt.

5. The polyurethane foam composition of claim 1 where the polyurethane reaction is conducted in the absence of a halocarbon blowing agent.

6. The polyurethane foam composition of claim 1 where the salts of the hydrated salt system are selected from the group consisting of

| | |
|---|---|
| $KAl(SO_4)_2.12H_2O$; | $Na_3PO_4.12H_2O$; |
| $Al_2(SO_4)_3.18H_2O$; | $Na_2B_4O_7.10H_2O$; |
| $Na_2SO_4.10H_2O$; | $Na_2CO_3.7H_2O$; |
| $AlNH_4(SO_4)_2.12H_2O$; | $Mg_3(PO_4)_2.22H_2O$; | and mixtures thereof.

7. The polyurethane foam composition of claim 1 where the hydrated salt system is selected from the group of systems consisting of:
(a) K $Al(SO_4)_2.12H_2O$ and $Na_2B_4O_7.10H_2O$;
(b) K $Al(SO_4)_2.12H_2O$ and $Na_3PO_4.12H_2O$;
(c) $Al_2(SO_4)_3.18H_2O$ and $Na_2B_4O_7.10H_2O$;
(d) $Al_2(SO_4)_3.18H_2O$ and $Na_3PO_4.12H_2O$;
(e) $Al_2(SO_4)_3.18H_2O$ and $Na_2CO_3.7H_2O$;
(f) K $Al(SO_4)_2.12H_2O$ and $Mg_3(PO_4)_2.22H_2O$;
(g) $Na_2SO_4.10H_2O$ and $Na_3PO_4.12H_2O$; and
(h) $AlNH_4(SO_4)_2.12H_2O$ and $Na_2B_4O_7.10H_2O$.

8. The polyurethane foam composition of claim 1 where the hydrated salt system comprises borax and alum.

9. A polyurethane foam composition comprising the reaction product of a polyol with a polyisocyanate in the presence of a polyurethane catalyst, and further in the presence of a hydrated salt system comprising at least two different hydrated salts which release water at a temperature above 80° C. and where the proportion of the hydrated salt system in the total of the components that make up the reaction product is sufficient to release from about 0.5 to 8 parts by weight of water during the reaction, in the absence of a halocarbon blowing agent.

10. The polyurethane foam composition of claim 9 where one of the two salts of the hydrated salt system is acidic and the other of the two salts is basic.

11. The polyurethane foam composition of claim 10 where the pH of the salt system is adjusted to be within the range of about 6 to about 9, only by adjusting the proportion of the acidic hydrated salt and the basic hydrated salt.

12. The polyurethane foam composition of claim 9 where the salts of the hydrated salt system are selected from the group consisting of

| | |
|---|---|
| $KAl(SO_4)_2.12H_2O$; | $Na_3PO_4.12H_2O$; |
| $Al_2(SO_4)_3.18H_2O$; | $Na_2B_4O_7.10H_2O$; |
| $Na_2SO_4.10H_2O$; | $Na_2CO_3.7H_2O$; |
| $AlNH_4(SO_4)_2.12H_2O$; | $Mg_3(PO_4)_2.22H_2O$; | and mixtures thereof.

13. The polyurethane foam composition of claim 9 where the hydrated salt system is selected from the group of systems consisting of:
(a) K $Al(SO_4)_2.12H_2O$ and $Na_2B_4O_7.10H_2O$;
(b) K $Al(SO_4)_2.12H_2O$ and $Na_3PO_4.12H_2O$;
(c) $Al_2(SO_4)_3.18H_2O$ and $Na_2B_4O_7.10H_2O$;
(d) $Al_2(SO_4)_3.18H_2O$ and $Na_3PO_4.12H_2O$;
(e) $Al_2(SO_4)_3.18H_2O$ and $Na_2CO_3.7H_2O$;
(f) K $Al(SO_4)_2.12H_2O$ and $Mg_3(PO_4)_2.22H_2O$;
(g) $Na_2SO_4.10H_2O$ and $Na_3PO_4.12H_2O$; and
(h) $AlNH_4(SO_4)_2.12H_2O$ and $Na_2B_4O_7.10H_2O$.

14. The polyurethane foam composition of claim 9 where the hydrated salt system comprises borax and alum.

15. A method for making a polyurethane foam composition comprising reacting a polyol with a polyisocyanate in the presence of a polyurethane catalyst, and further in the presence of a hydrated salt system comprising at least two different hydrated salts which release water at a temperature above 80° C.

16. The method of claim 15 where the proportion of the hydrated salt system in the total of the components that make up the reaction product is sufficient to release from about 0.5 to 8 parts by weight of water during the reaction.

17. The method of claim 15 where one of the two salts of the hydrated salt system is acidic and the other of the two salts is basic.

18. The method of claim 17 where the pH of the salt system is adjusted to be within the range of about 6 to about 9, only by adjusting the proportion of the acidic hydrated salt and the basic hydrated salt.

19. The method of claim 15 where the polyurethane reaction is conducted in the absence of a halocarbon blowing agent.

20. The method of claim 15 where the salts of the hydrated salt system are selected from the group consisting of

| | |
|---|---|
| $KAl(SO_4)_2.12H_2O$; | $Na_3PO_4.12H_2O$; |

-continued

| | |
|---|---|
| Al$_2$(SO$_4$)$_3$.18H$_2$O; | Na$_2$B$_4$O$_7$.10H$_2$O; |
| Na$_2$SO$_4$.10H$_2$O; | Na$_2$CO$_3$.7H$_2$O; |
| AlNH$_4$(SO$_4$)$_2$.12H$_2$O; | Mg$_3$(PO$_4$)$_2$.22H$_2$O; | and mixtures thereof.

21. The method of claim 15 where the hydrated salt system is selected from the group of systems consisting of:
  (a) K Al(SO$_4$)$_2$.12H$_2$O and Na$_2$B$_4$O$_7$.10H$_2$O;
  (b) K Al(SO$_4$)$_2$.12H$_2$O and Na$_3$PO$_4$.12H$_2$O;
  (c) Al$_2$(SO$_4$)$_3$.18H$_2$O and Na$_2$B$_4$O$_7$.10H$_2$O;
  (d) Al$_2$(SO$_4$)$_3$.18H$_2$O and Na$_3$PO$_4$.12H$_2$O;
  (e) Al$_2$(SO$_4$)$_3$.18H$_2$O and Na$_2$CO$_3$.7H$_2$O;
  (f) K Al(SO$_4$)$_2$.12H$_2$O and Mg$_3$(PO$_4$)$_2$.22H$_2$O;
  (g) Na$_2$SO$_4$.10H$_2$O and Na$_3$PO$_4$.12H$_2$O; and
  (h) AlNH$_4$(SO$_4$)$_2$.12H$_2$O and Na$_2$B$_4$O$_7$.10H$_2$O.

22. The method of claim 15 where the hydrated salt system comprises borax and alum.

23. A method for making a polyurethane foam composition comprising reacting a polyol with a polyisocyanate in the presence of a polyurethane catalyst, and further in the presence of a hydrated salt system comprising at least two different hydrated salts which release water at a temperature above 80° C., and where the proportion of the hydrated salt system in the total of the components that make up the reaction product is sufficient to release from about 0.5 to 8 parts by weight of water during the reaction, in the absence of a halocarbon blowing agent.

24. The method of claim 23 where one of the two salts of the hydrated salt system is acidic and the other of the two salts is basic.

25. The method of claim 24 where the pH of the salt system is adjusted to be within the range of about 6 to about 9, only by adjusting the proportion of the acidic hydrated salt and the basic hydrated salt.

26. The method of claim 23 where the salts of the hydrated salt system are selected from the group consisting of

| | |
|---|---|
| KAl(SO$_4$)$_2$.12H$_2$O; | Na$_3$PO$_4$.12H$_2$O; |
| Al$_2$(SO$_4$)$_3$.18H$_2$O; | Na$_2$B$_4$O$_7$.10H$_2$O; |
| Na$_2$SO$_4$.10H$_2$O; | Na$_2$CO$_3$.7H$_2$O; |
| AlNH$_4$(SO$_4$)$_2$.12H$_2$O; | Mg$_3$(PO$_4$)$_2$.22H$_2$O; | and mixtures thereof.

27. The method of claim 23 where the hydrated salt system is selected from the group of systems consisting of:
  (a) K Al(SO$_4$)$_2$.12H$_2$O and Na$_2$B$_4$O$_7$.10H$_2$O;
  (b) K Al(SO$_4$)$_2$.12H$_2$O and Na$_3$PO$_4$.12H$_2$O;
  (c) Al$_2$(SO$_4$)$_3$.18H$_2$O and Na$_2$B$_4$O$_7$.10H$_2$O;
  (d) Al$_2$(SO$_4$)$_3$.18H$_2$O and Na$_3$PO$_4$.12H$_2$O;
  (e) Al$_2$(SO$_4$)$_3$.18H$_2$O and Na$_2$CO$_3$.7H$_2$O;
  (f) K Al(SO$_4$)$_2$.12H$_2$O and Mg$_3$(PO$_4$)$_2$.22H$_2$O;
  (g) Na$_2$SO$_4$.10H$_2$O and Na$_3$PO$_4$.12H$_2$O; and
  (h) AlNH$_4$(SO$_4$)$_2$.12H$_2$O and Na$_2$B$_4$O$_7$.10H$_2$O.

28. The method of claim 23 where the hydrated salt system is comprises borax and alum.

* * * * *